United States Patent [19]
Coons

[11] Patent Number: 6,137,478
[45] Date of Patent: Oct. 24, 2000

[54] I/O PIN ARRAY

[76] Inventor: James A. Coons, 11729 Fifteen Mile Rd. #1B, Sterling Heights, Mich. 48312

[21] Appl. No.: 09/127,532

[22] Filed: Jul. 31, 1998

[51] Int. Cl.$^7$ ........................................................ G09G 5/00
[52] U.S. Cl. ............................................ 345/168; 345/184
[58] Field of Search ...................... 714/731, 724, 714/726; 439/153, 69, 346, 152, 154, 155, 156, 157, 158, 159, 160, 310, 330, 345; 345/168, 184, 108, 114, 119, 120

[56] References Cited

U.S. PATENT DOCUMENTS

| | | | |
|---|---|---|---|
| 4,596,429 | 6/1986 | Gierut et al. ............................... | 339/19 |
| 4,674,811 | 6/1987 | Corwin ....................................... | 439/69 |
| 4,761,141 | 8/1988 | Hawk et al. ............................... | 439/153 |
| 4,848,942 | 7/1989 | Speicher ..................................... | 400/121 |
| 4,930,912 | 6/1990 | Speicher ..................................... | 400/48 |
| 5,717,423 | 2/1998 | Parker . | |
| 5,931,962 | 8/1999 | Dang ........................................ | 714/371 |

*Primary Examiner*—Ayaz R. Sheikh
*Assistant Examiner*—Tim Vo

[57] ABSTRACT

A pin input/output device is provided including a housing with a plurality of bores formed therein. Also included is a plurality of pin solenoids each having a unique address and a transducer slidable with respect to one of the bores of the housing. A plurality of pin position potentiometers are each mounted on an associated one of the pin solenoids for generating a position signal which is representative of a current position of the corresponding transducer with respect to the housing. An interface logic is connected to the pin position potentiometers for generating digital output signals each including the address of a designated one of the pin solenoids and the current position of the designated one of the pin solenoids as indicated by the position signal. It should be noted that the interface logic may further be used to extend the transducers per received input signals.

7 Claims, 2 Drawing Sheets

I/O PIN ARRAY

BACKGROUND OF THE INVENTION

1. Field of the Invention

The present invention relates to I/O devices and more particularly pertains to a new I/O pin array for representing various data with a matrix of extendible pins and further providing a means of inputting data via the pins.

2. Description of the Prior Art

The use of I/O devices is known in the prior art. More specifically, I/O devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art I/O devices or the like include U.S. Pat. No. 4,514,814; U.S. Pat. No. 4,761,534; U.S. Pat. No. 4,705,401; U.S. Pat. No. 4,051,483; U.S. Pat. No. Des. 256,784; and U.S. Pat. No. 5,337,149; U.S. Pat. No. 5,262,778; U.S. Pat. No. 5,412,420; U.S. Pat. No. 5,412,880; U.S. Pat. No. 5,189,806; U.S. Pat. No. 5,148,377; U.S. Pat. No. Des. 325,572; and U.S. Pat. No. 4,833,630.

In these respects, the I/O pin array according to the present invention substantially departs from the conventional concepts and designs of the prior art, and in so doing provides an apparatus primarily developed for the purpose of representing various data with a matrix of extendible pins and further providing a means of inputting data via the pins.

SUMMARY OF THE INVENTION

In view of the foregoing disadvantages inherent in the known types of I/O devices now present in the prior art, the present invention provides a new I/O pin array construction wherein the same can be utilized for representing various data with a matrix of extendible pins and further providing a means of inputting data via the pins.

The general purpose of the present invention, which will be described subsequently in greater detail, is to provide a new I/O pin array apparatus and method which has many of the advantages of the I/O devices mentioned heretofore and many novel features that result in a new I/O pin array which is not anticipated, rendered obvious, suggested, or even implied by any of the prior art I/O devices, either alone or in any combination thereof.

To attain this, the present invention generally comprises a housing with a rectangular configuration. The housing preferably has a bottom face, a top face and a peripheral side wall coupled therebetween for defining an interior space. For reasons that will soon become apparent, the top face has a matrix of bores formed therein. Next provided is a plurality of pin solenoids each having a unique address. As shown in FIG. 2, each pin solenoid includes a pin casing having a hollow cylindrical configuration and coupled to the bottom face of the housing within the interior space thereof. Each pin solenoid preferably remains in alignment with one of the bores of the housing. Each pin casing has a circular bottom face, a circular top face, and a cylindrical side wall between the top face and the bottom face. An aperture is formed in the top face of the pin casing for defining an inwardly extending lip. Each pin solenoid further includes a transducer slidably situated within the pin casing and extending from the aperture thereof and the associated bore of the housing. Wrapped about the transducer is a coil spring which resides exterior of the pin casing. The coil spring preferably has a first end connected to the top face of the pin casing and second end connected to the transducer. The coil spring is adapted for urging the transducer into a neutral position. In such neutral position, the top end of the transducer is extended a predetermined distance above the top face of the housing. As a final component of the pin solenoid, a pin coil is mounted within a bottom extent of the pin casing for urging the transducer a predetermined distance from the top face of the housing upon the receipt of an activation signal. It should be noted that an extent to which the transducer extends above the top face of the housing is a function of a magnitude of the activation signal. Also included is a plurality of pin position potentiometers each mounted on an associated one of the pin solenoids. In operation, each pin position potentiometer is adapted for generating a position signal which is representative of a current position of the corresponding transducer with respect to the top face of the housing. As shown in FIG. 3, interface logic is connected to the relay coils of the pin solenoids with digital-to-analog converters connected therebetween. In use, the interface logic serves for transmitting activation signals to the pin solenoids upon the receipt of a digital input signal with an associated address. The activation signals are each transmitted to one of the pin solenoids with an address corresponding with that of input signal. Further, the activation signals each have a magnitude dictated by the input signal. With reference still to FIG. 3, the interface logic is connected to the pin position potentiometers with analog-to-digital converters connected therebetween. In operation, the interface logic is adapted for generating digital output signals each including the address of a designated one of the pin solenoids. Such digital output signals further include the current position of the designated one of the pin solenoids as indicated by the position signal.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new I/O pin array apparatus and method which has many of the advantages of the I/O devices mentioned heretofore and many novel features that result in a new I/O pin array which is not anticipated, rendered obvious, suggested, or even implied by any of the prior art I/O devices, either alone or in any combination thereof.

It is another object of the present invention to provide a new I/O pin array which may be easily and efficiently manufactured and marketed.

It is a further object of the present invention to provide a new I/O pin array which is of a durable and reliable construction.

An even further object of the present invention is to provide a new I/O pin array which is susceptible of a low cost of manufacture with regard to both materials and labor, and which accordingly is then susceptible of low prices of sale to the consuming public, thereby making such I/O pin array economically available to the buying public.

Still yet another object of the present invention is to provide a new I/O pin array which provides in the apparatuses and methods of the prior art some of the advantages thereof, while simultaneously overcoming some of the disadvantages normally associated therewith.

Still another object of the present invention is to provide a new I/O pin array for representing various data with a matrix of extendible pins and further providing a means of inputting data via the pins.

Even still another object of the present invention is to provide a new I/O pin array that includes a housing with a plurality of bores formed therein. Also included is a plurality of pin solenoids each having a unique address and a transducer slidable with respect to one of the bores of the housing. A plurality of pin position potentiometers are each mounted on an associated one of the pin solenoids for generating a position signal which is representative of a current position of the corresponding transducer with respect to the housing. An interface logic is connected to the pin position potentiometers for generating digital output signals each including the address of a designated one of the pin solenoids and the current position of the designated one of the pin solenoids as indicated by the position signal. It should be noted that the interface logic may further be used to extend the transducers per received input signals.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENTS

Figure 1:
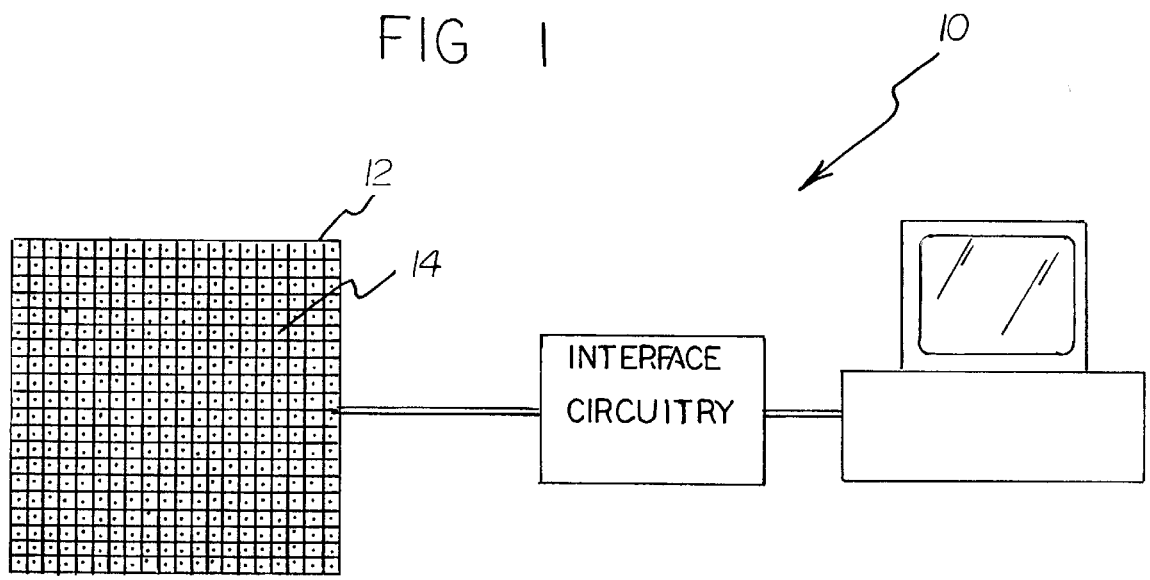
FIG. 1 is a general schematic diagram of a new I/O pin array according to the present invention in use in conjunction with a computer.
Figure 2:
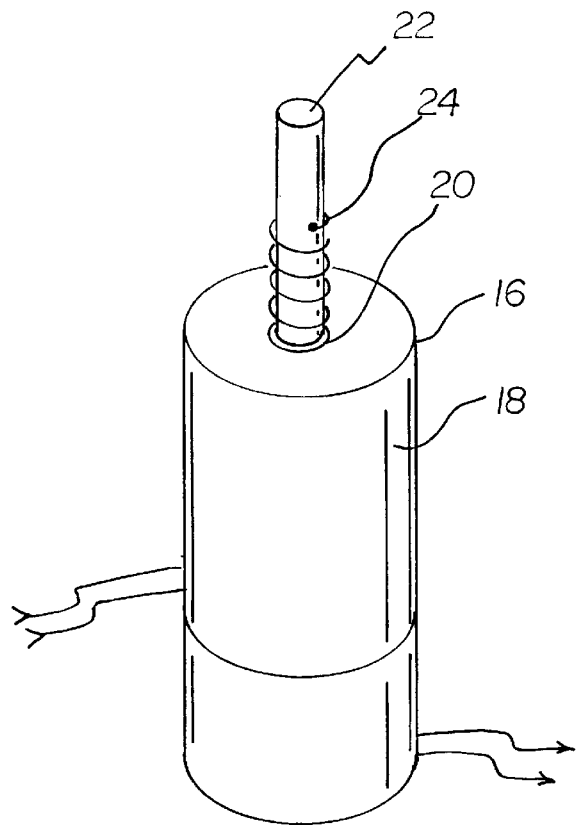
FIG. 2 is a perspective view of the pin solenoid of the present invention.
Figure 3:
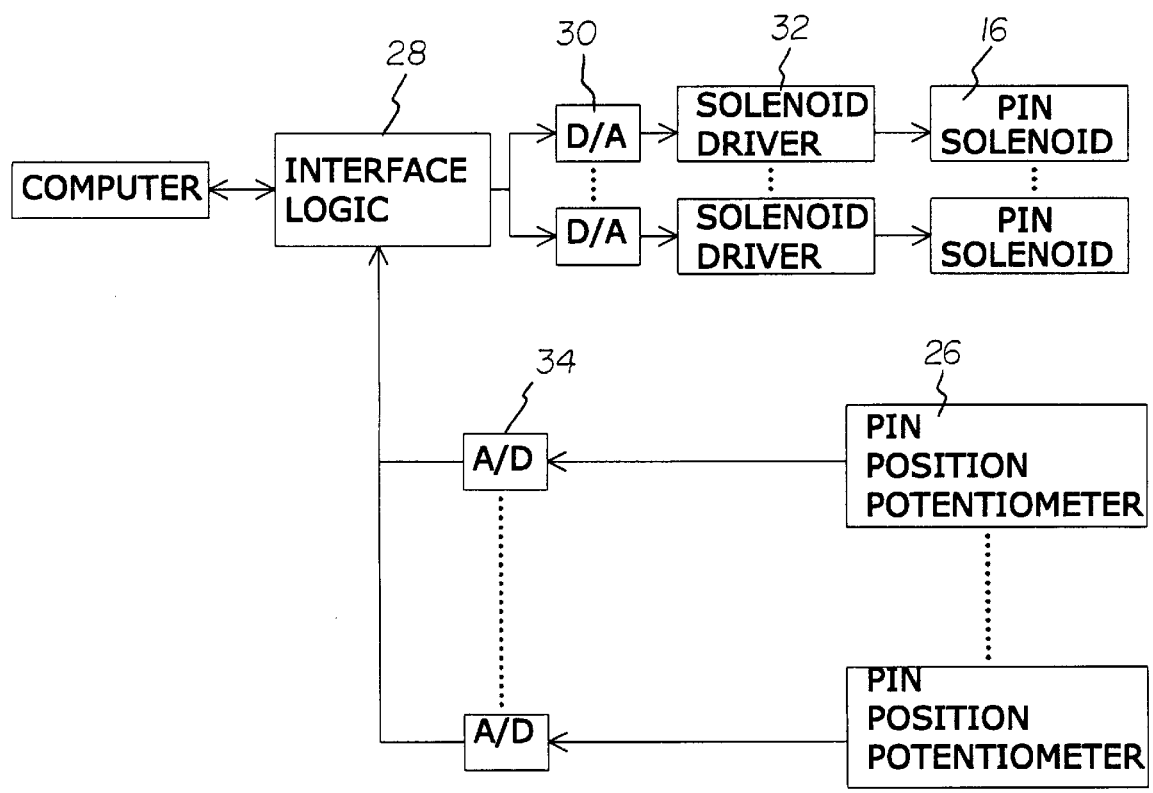
FIG. 3 is a schematic diagram of the present invention.

With reference now to the drawings, and in particular to FIGS. 1 through 3 thereof, a new I/O pin array embodying the principles and concepts of the present invention and generally designated by the reference numeral 10 will be described.

The present invention, designated as numeral 10, includes a housing 12 with a rectangular configuration. The housing preferably has a bottom face, a top face and a peripheral side wall coupled therebetween for defining an interior space. For reasons that will soon become apparent, the top face has a square matrix of bores 14 formed therein.

Next provided is a plurality of pin solenoids 16 each having a unique address. Ideally, each address has an X and Y component. As shown in FIG. 2, each pin solenoid includes a pin casing 18 having a hollow cylindrical configuration and coupled to the bottom face of the housing within the interior space thereof. Each pin solenoid preferably remains in alignment with one of the bores of the housing. Each pin casing further has a circular bottom face, a circular top face, and a cylindrical side wall mounted between the top face and the bottom face. An aperture 20 is formed in the top face of the pin casing for defining an inwardly extending lip.

Each pin solenoid further includes a transducer 22 slidably situated within the pin casing and extending from the aperture thereof and the associated bore of the housing. In the preferred embodiment, the transducer and pin casing may be equipped with a slot and groove for ensuring alignment. Wrapped about the transducer is a coil spring 24 which resides exterior of the pin casing. The coil spring preferably has a first end connected to the top face of the pin casing and second end connected to the transducer. The coil spring is adapted for urging the transducer into a neutral position. In such neutral position, the top end of the transducer is extended a predetermined distance above the top face of the housing.

As a final component of the pin solenoid, an unillustrated pin coil, or motivator, is mounted within a bottom extent of the pin casing for urging the transducer a predetermined distance from the top face of the housing upon the receipt of an activation signal. Such predetermined distance may be either above or below the aforementioned neutral position. It should be noted that an extent to which the transducer extends above the top face of the housing is a function of a magnitude of the activation signal. In an alternate embodiment, the activation signal may be simplified to include "ON" and "OFF" signals for transferring the transducer between an extended or retracted orientation.

It should be readily apparent that the activation signal would have to be continuos in nature in order to maintain the coil spring of the pin solenoid "biased" and the transducer in its desired orientation. In the alternative, the coil spring may be removed in favor of a friction between the transducer and the pin casing. This would permit the activation signal to be sent temporarily after which the friction would maintain the transducer in place. This, of course, would require an additional activation signal to return the transducer to the desired orientation. Which embodiment is employed is dependent on the desires of the user.

Also included is a plurality of pin position potentiometers 26 each mounted on an associated one of the pin solenoids.

In operation, each pin position potentiometer is adapted for generating a position signal which is representative of a current position of the corresponding transducer with respect to the top face of the housing. While not shown, it should be readily understood that the pin position potentiometers preferably include linear potentiometers which may be situated with the pin casing below the transducer.

As shown in FIG. 3, interface logic 28 is connected to the relay coils of the pin solenoids with digital-to-analog converters 30 connected therebetween. In use, the interface logic serves for transmitting activation signals to the pin solenoids upon the receipt of a digital input signal with an associated address. The activation signals are each transmitted to one of the pin solenoids with an address corresponding with that of input signal. Further, the activation signals, at the output of the digital-to-analog converters, each have a magnitude dictated by the input signal. Solenoid drivers 32 may also be employed to tailor, or proportionally amplify, the magnitude of the activation signals such that they are capable of energizing the relay coils.

With reference still to FIG. 3, the interface logic is also connected to the pin position potentiometers with analog-to-digital converters 34 connected therebetween. In operation, the interface logic is adapted for continuously generating digital output signals each including the addresses of the pin solenoids and the current position of such pin solenoids, as indicated by the position signals.

As an option, additional sensors may be mounted to the top end of the transducers including, but not limited to, heat, sound, light, opacity and hardness sensors. Such sensors preferably include an extendible output wire which runs through the transducer and out the pin solenoid. The signals gathered from such sensors may be incorporated with the output signals for being exploited by an outside source.

The present invention constitutes an I/O device which may be utilized in conjunction with any system such as a computer, automobile or the like. It should be understood that the present invention may be reduced to a simple input device, or in the alternative, a simple output device. There are many applied uses of the present invention. For example, a user may input a foot or other body part size by simply placing his or her foot or body part on the pins.

Further, in another embodiment, the pin solenoids may be used to give a visual representation of sound. In such embodiment, the X-axis would representative of frequency and the Y-axis would be representative of volume. Once side of each axis would represent higher frequencies or magnitudes with respect to an opposite side. To accomplish this, also included would be a microphone which in turn is connected to a sound analysis unit. The sound analysis unit functions to determine the frequency and magnitude of received audio signals and further generate signals which may be received by the interface logic which will extend the transducers in accordance with the scheme set forth hereinabove. As an option, the extent to which each transducer is extended may be a function of bass, treble, purity or any other auxiliary parameter. Additional features which may be incorporated in the present embodiment include: a volume knob on the sound analysis unit for selecting the level of amplification of the sounds which in turn governs the extent to which the pins are moved in response to the sounds, a volume sensitivity knob for selectively abating, or filtering, loud obtrusive sounds in favor of softer sounds, and a frequency sensitivity knob for selectively filtering sounds with higher or lower frequencies.

Additional applications will now be set forth. The present I/O device may be used as an advertising sign for the purpose of conveying an intermittent sequence of 3-dimensional Braille and/or text messages and/or pictures to a person. The present invention may also be used to visually analyze reflected sound for the purpose of locating pipes, studs or defects in a wall or the like. The present invention may also serve blind persons by converting text to Braille. Yet another application includes the use of the present invention as an optical analyzer and plotter.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relations hips for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pin matrix I/O device comprising, in combination:
   a housing with a rectangular configuration having a bottom face, a top face and a peripheral side wall coupled therebetween for defining an interior space, the top face having a matrix of bores formed therein;
   a plurality of pin solenoids each having a unique address and including:
      a pin casing having a hollow cylindrical configuration and coupled to the bottom face of the housing within the interior space thereof and in alignment with one of the bores thereof, each pin casing having a circular bottom face, a circular top face, a cylindrical side wall mounted between the top face and the bottom face, and an aperture formed in the top face of the pin casing for defining an inwardly extending lip,
      a transducer slidably situated within the pin casing and extending front the aperture thereof and the associated bore of the housing,
      a coil spring wrapped about the transducer and residing exterior of the pin casing, the coil ring having a first end connected to the top face of the pin casing and second end connected to the transducer for urging the transducer into a neutral position with a top end of the transducer extended a predetermined distance above the top face of the housing, and
      a pin coil mounted within a bottom extent of the pin casing for urging the transducer a predetermined distance from the top face of the housing upon the receipt of an activation signal, wherein an extent to which the transducer extends above the top face of the housing is a function of a magnitude of the activation signal;
   a plurality of pin position potentiometers each mounted on an associated one of the pin solenoids for generating a position signal which is representative of a current position of the corresponding transducer with respect to the top face of the housing; and interface logic connected to the relay coils of the pin solenoids with digital-to-analog converters connected therebetween for transmitting activation signals to the pin solenoids upon the receipt of a digital input signal with an associated address, wherein the activation signals are each transmitted to one of the pin solenoids with an address corresponding with that of input signal and the activation signals each have a magnitude dictated by the input signal, the interface logic connected to the pin position potentiometers with analog-to-digital converters connected therebetween for generating digital output signals each including the address of a designated one of the pin solenoids and the current position of the designated one of the pin solenoids as indicated by the position signal.

2. A pin output device comprising:

a housing having a plurality of bores;

a plurality of pin solenoids each having a unique address and including:

a pin casing having a hollow configuration and an aperture formed in a top face of the pin casing, the aperture of the pin casing being in communication with one of the bores of the housing, a transducer slidable with respect to the pin casing, the transducer into a neutral position with a top end of the transducer extending a predetermined distance above the top face of the pin casing, and a pin motivator for urging the transducer a distance from the housing upon the receipt of an activation signal; and interface circuitry connected to the pin motivators of the pin solenoids for transmitting activation signals to the pin solenoids upon the receipt of an input signal with associated addresses, wherein the activation signals are each transmitted to one of the pin solenoids with an address corresponding with that received with the input signal.

3. A pin output device as set forth in claim 2 wherein the interface circuitry is connected to a computer.

4. A pin output device as set forth in claim 2 wherein an extent to which the transducer extends above the housing is a function of a parameter of the activation signal and further wherein the activation signals are each transmitted by the interface circuitry to the pin solenoids with the parameter which is dictated by the input signal.

5. A pin matrix input/output device comprising:

a housing with a top having a matrix of bores formed in the top;

a plurality of pin solenoids each having a unique address and including:

a pin casing having a hollow configuration and an aperture formed in a top face of the pin casing for defining an inwardly extending lip, the aperture of the pin casing being in communication with one of the bores in the top of the housing;

a transducer slidably situated in the pin casing and extending from the aperture thereof and the associated bore of the housing, a coil spring wrapped about the transducer and extending out of the pin casing, the coil spring having a first end connected to the pin casing and a second end connected to the transducer for urging the transducer into a neutral position with a top end of the transducer extended a predetermined distance above the top of the housing, and a pin coil mounted in the pin casing for urging the top end of the transducer a predetermined distance from the top of the housing upon the receipt of an activation signal, wherein an extent to which the transducer extends above the top face of the housing is a function of a magnitude of the activation signal;

a plurality of pin position potentiometers each mounted on an associated one of the pin solenoids for generating a position signal which is representative of a current position of the corresponding transducer with respect to the top of the housing; and interface logic connected to the relay coils of the pin solenoids with digital-to-analog converters connected therebetween for transmitting activation signals to the pin solenoids upon the receipt of a digital input signal with an associated address, wherein the activation signals are each transmitted to one of the pin solenoids with an address corresponding with that of input signal and the activation signals each have a magnitude dictated by the input signal, the interface logic connected to the pin position potentiometers with analog-to-digital converters connected therebetween for generating digital output signals each including the address of a designated one of the pin solenoids and the current position of the designated one of the pin solenoids as indicated by the position signal.

6. A pin input device as set forth in claim 5 wherein the interface logic is connected to a computer.

7. The input/output device as set forth in claim 5 wherein the housing has a rectangular configuration with a bottom and a peripheral side wall coupled between the top and bottom for defining an interior space.

\* \* \* \* \*